(12) United States Patent
Kwon et al.

(10) Patent No.: US 11,378,816 B2
(45) Date of Patent: Jul. 5, 2022

(54) DISPLAY DEVICE

(71) Applicant: SAMSUNG DISPLAY CO., LTD., Yongin-si (KR)

(72) Inventors: Jae Joong Kwon, Suwon-si (KR); Joo Woan Cho, Seongnam-si (KR); Ju Hwa Ha, Jung-gu (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 15/792,228

(22) Filed: Oct. 24, 2017

(65) Prior Publication Data

US 2018/0275417 A1    Sep. 27, 2018

(30) Foreign Application Priority Data

Mar. 24, 2017    (KR) .......................... 10-2017-0037812

(51) Int. Cl.
*G02B 30/36* (2020.01)
*G02B 3/00* (2006.01)
*G02B 30/27* (2020.01)

(52) U.S. Cl.
CPC ........... *G02B 30/36* (2020.01); *G02B 3/0056* (2013.01); *G02B 3/0062* (2013.01); *G02B 30/27* (2020.01)

(58) Field of Classification Search
None
See application file for complete search history.

(56) References Cited

U.S. PATENT DOCUMENTS

| 6,942,959 | B2 | 9/2005 | Dubin et al. |
| 7,050,020 | B2 | 5/2006 | Uehara et al. |
| 9,335,638 | B2* | 5/2016 | De Jager ............. G03F 7/70275 |
| 9,891,441 | B2 | 2/2018 | Kim et al. |
| 2008/0094700 | A1* | 4/2008 | Uehara ................ G02B 5/0257 |
| | | | 359/463 |
| 2014/0118702 | A1* | 5/2014 | Taniguchi .............. G03B 21/14 |
| | | | 353/38 |
| 2014/0300711 | A1* | 10/2014 | Kroon .................. H04N 13/305 |
| | | | 348/51 |
| 2015/0316776 | A1* | 11/2015 | Gao .................... G02B 26/0883 |
| | | | 348/59 |
| 2017/0034504 | A1 | 2/2017 | Bui |
| 2017/0219426 | A1* | 8/2017 | Pacala .................... G01S 17/894 |
| 2018/0020211 | A1* | 1/2018 | Huang ................... G02B 30/27 |
| 2018/0284465 | A1* | 10/2018 | Kwon ................ H01L 27/1463 |

FOREIGN PATENT DOCUMENTS

| CN | 103345068 | 10/2013 |
| JP | 4687073 | 2/2011 |
| JP | 4725654 | 4/2011 |
| KR | 10-1336344 | 11/2013 |

* cited by examiner

*Primary Examiner* — Christopher Stanford
*Assistant Examiner* — Journey F Sumlar
(74) *Attorney, Agent, or Firm* — F. Chau & Associates, LLC

(57) ABSTRACT

A display device includes a display unit that includes a plurality of pixels; a first lens array unit that includes a plurality of first lenses; and a second lens array unit disposed between the first lens array unit and the display unit and that includes a plurality of second lenses. Each of the first lenses overlaps two or more of the pixels, and a pitch of the second lenses is less than a pitch of the first lenses.

13 Claims, 25 Drawing Sheets

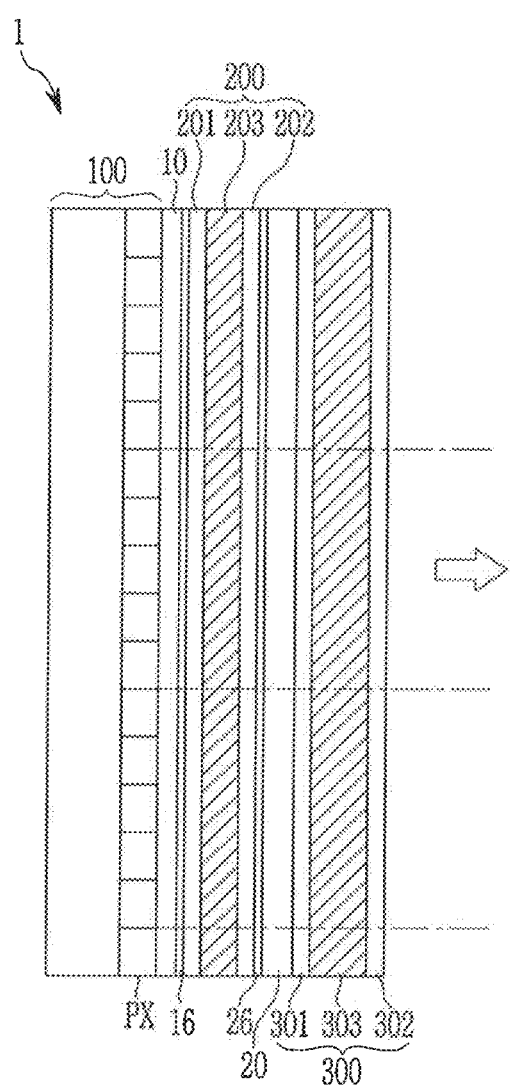

DISPLAY DEVICE

CROSS-REFERENCE TO RELATED APPLICATION

This application claims priority under 35 U.S.C. § 119 from, and the benefit of, Korean Patent Application No. 10-2017-0037812, filed in the Korean Intellectual Property Office on Mar. 24, 2017, the contents of which are herein incorporated by reference in their entirety.

BACKGROUND

(a) Technical Field

Embodiments of the present disclosure are directed to a display device, and more particularly, to a multi-view display device that includes a lens.

(b) Discussion of the Related Art

Three-dimensional (3D) image display devices have been the subject of much development recently, and various 3D image display devices have been studied.

A three-dimensional image can be displayed using binocular disparity to be perceived in three dimensions. A 3D image display device can be classified according to the display method, and may be classified as a stereoscopic 3D image display device or an autostereoscopic 3D image display device. Stereoscopic 3D image display device require spectacles to be worn for the 3D image to be perceived, and thus further development of autostereoscopic 3D image display devices is desirable.

An autostereoscopic 3D image display device may be classified into those using a multi-viewpoint or a super multi-viewpoint method, in which the 3D image may be perceived without spectacles in a specific viewing angle region, also referred to as a viewpoint, or those using an integrated image method, a volume image method, or a hologram method that can provide something close to an actual 3D image. Of these methods, the multi-viewpoint method may be further classified into a spatial division method that spatially divides the entire image to realize the required number of viewpoints by using a lens array, and a temporal division method that temporally and quickly displays several viewpoint images without dividing the image. In an integrated image method, an image in which 3D image information is photographed with a limited size different directions is stored and then is projected through a lens array, thereby allowing the 3D image to be perceived by the observer.

An autostereoscopic 3D image display device includes a photomodulation unit that uses a lens array to control a path of light.

SUMMARY

Exemplary embodiments of the disclosure can provide improved 3D image quality by suppressing moiré phenomenon and mitigating an inversion phenomenon of the 3D images, by increasing image luminance for each viewpoint without modifying a structure of a display unit.

An exemplary embodiment of the present invention provides a display device, including a display unit that includes a plurality of pixels; a first lens array unit that includes a plurality of first lenses; and a second lens array unit disposed between the first lens array unit and the display unit and that includes a plurality of second lenses. Each of the first lenses overlaps two or more of the pixels, and a pitch of the second lenses is less than a pitch of the first lenses.

An exemplary embodiment of the present invention provides a display device, including a display unit that includes a plurality of pixels; a first lens array unit that includes a plurality of first lenses; and a second lens array unit disposed between the first lens array unit and the display unit and that includes a plurality of second lenses. A width of a second lens of the plurality of second lenses is equal to or less than a pitch of the pixels, and a width of a first lens of the plurality of first lenses is greater than the width of the second lens.

An exemplary embodiment of the present invention provides a display device, including a display unit that includes a plurality of pixels; a first lens array unit that includes a plurality of first lenses; and a second lens array unit disposed between the first lens array unit and the display unit and that includes a plurality of second lenses. A width of a first lens of the plurality of first lenses is greater than the width of the second lens, and a number of the second lenses that face one lens of the plurality of first lenses is equal to a number of pixels that face one lens of the plurality of first lenses.

A number of the second lenses that face one first lens of the plurality of first lenses may be equal to a number of the pixels facing one lens of the plurality of first lenses.

A pitch of the second lenses may be equal to or less than a pitch of the pixels.

When the pitch of the second lenses is equal to the pitch of the pixels, a straight line that connects a center of a pixel of the plurality of pixels and a center of a second lens of the plurality of second lenses that correspond to the pixel may be parallel with an optical axis of the second lens.

When the pitch of the second lenses is less than the pitch of the pixels, a straight line that connects a center of a pixel of the plurality pixels and a center of a second lens of the plurality of second lenses that correspond to the pixel may not be parallel with an optical axis of the second lens. Straight lines that each connects a center of each of the pixels and a center of each of the second lenses may converge on one first point in the one first lens of the plurality of first lenses.

Letting a shortest distance between the display unit and a center of a second lens of the plurality of second lenses be represented by D1, and a focal distance of the second lens be represented by f2, the following equation may be satisfied: $0.5 \times f2 \leq D1 \leq 1.5 \times f2$.

Letting a shortest distance between a center of the second lens and a center of a first lens of the plurality of first lenses be represented by D2, and a focal distance of the first lens be represented by f1, the following equation may be satisfied: $0.5 \times f1 \leq D1 \leq 1.5 \times f1$.

Each of the second lenses may be a microlens, and each of the first lenses may be a microlens or a lenticular lens.

Each of the second lenses may be a lenticular lens, and each of the first lenses may be a microlens or a lenticular lens.

The display device may further include a first interlayer disposed between the display unit and the second lens array unit, and the second lens array unit may be directly formed on the first interlayer.

The display device may further include a second interlayer disposed between the second lens array unit and the first lens array unit, and the first lens array unit may be directly formed on the second interlayer.

The display device may further include at least one of a first adhesive member disposed between the display unit and the second lens array unit, or a second adhesive member disposed between the second lens array unit and the first lens array unit.

At least one of the first lens array unit or the second lens array unit may have a lens-sheet shape.

At least one of the first lens array unit or the second lens array unit may be a switchable light modulation unit that includes a pair of substrates and a light modulation layer disposed between the pair of substrates.

Two or more of the pixels that correspond to one first lens may correspond to different viewpoints from each other.

According to exemplary embodiments of the disclosure, it is possible to improve quality of 3D images by suppressing a moiré phenomenon and mitigating inversion of the 3D images, by increasing image luminance for each viewpoint without modifying a structure of a display unit.

BRIEF DESCRIPTION OF THE DRAWINGS

FIG. 22 to FIG. 25 are cross-sectional views that illustrate a display device according to an exemplary embodiment.

DETAILED DESCRIPTION OF EXEMPLARY EMBODIMENTS

Figure 1:
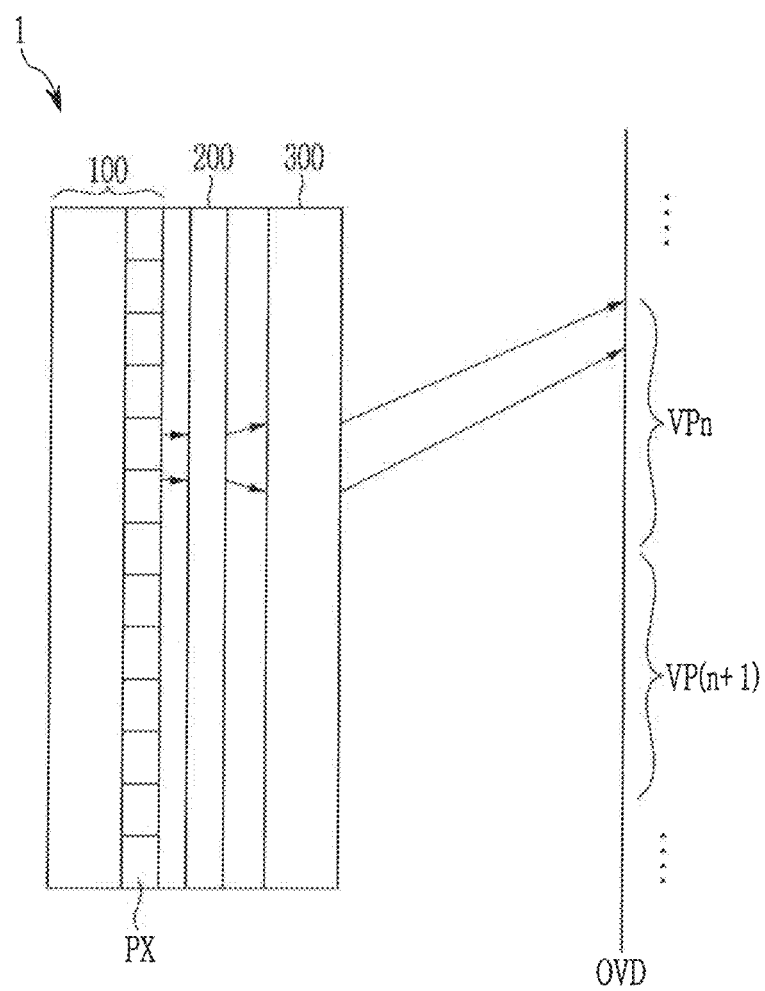
FIG. 1 is a schematic cross-sectional view that illustrates a display device according an exemplary embodiment.

Embodiments of the present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present invention.

Like numerals may refer to like or similar constituent elements throughout the specification.

In the drawings, the thickness of layers, films, panels, regions, etc., may be exaggerated for clarity.

It will be understood that when an element such as a layer, film, region, or substrate is referred to as being "on" another element, it can be directly on the other element or intervening elements may also be present.

Hereinafter, a display device according to an exemplary embodiment will be described with reference to FIG. 1 to FIG. 11.

First, referring to FIG. 1, a display device 1 according to a present exemplary embodiment includes a display unit 100 that has a plurality of pixels PX, a first lens array unit 300, and a second lens array unit 200 disposed between the display unit 100 and the first lens array unit 300.

According to embodiments, each of the pixels PX, which are the unit areas for displaying an image, emits light of one of the primary colors such as red, green, and blue, depending on the image information.

According to embodiments, a plurality of lenses included in the first lens array unit 300 overlap the display area in which the pixels PX are disposed, and a plurality of lenses included in the second lens array unit 200 also overlap the display area in which the pixels PX are disposed.

According to embodiments, light emitted from the display unit 100 propagates through the second lens array unit 200 and the first lens array unit 300 in the order as illustrated in FIG. 1, and an optimized image can be observed at an observation position OVD. The observation position OVD includes a plurality of viewpoints VPn, VP (n+1), . . . , and different images can be observed at different viewpoints VPn, VP(n+1), . . . . Accordingly, a 3D image or a multi-viewpoint image can be observed.

According to embodiments, at least one of the first lens array unit 300 or the second lens array unit 200 is a lens sheet in which a plurality of lenses are disposed in a plan view, and is a switchable light modulation unit, such as a liquid crystal layer than can form a liquid crystal lens.

The second lens array unit 200 may be disposed on the display unit 100 as a thin layer using a same process as that used to manufacture the display unit 100. Alternatively, the second lens array unit 200 may be manufactured as a separate panel, and then may be attached to the display unit 100 using an adhesive member. Similarly, the first lens array unit 300 may be disposed on the second lens array unit 200 as a thin layer using a same process as that used to manufacture the display unit 100. Alternatively, the first lens array unit 300 may be manufactured as a separate panel, and then may be attached to the second lens array unit 200 using an adhesive member.

Figure 2:
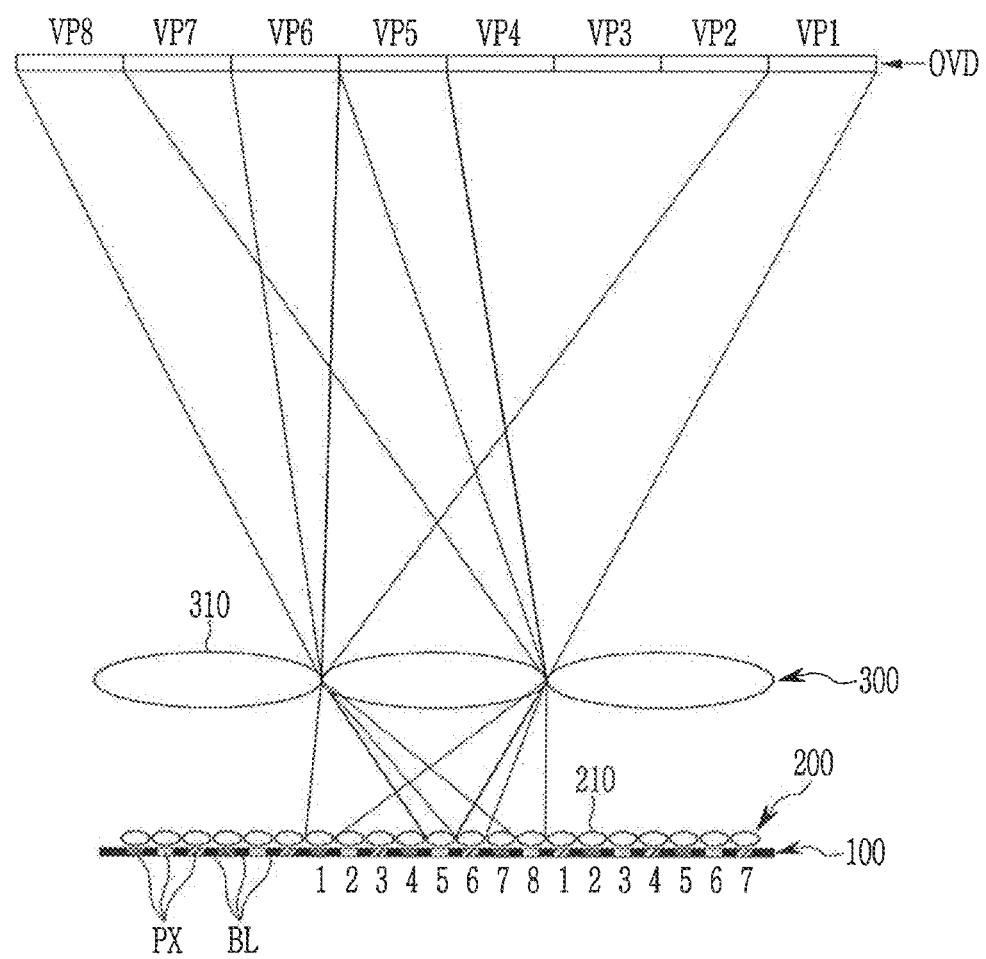
FIG. 2 is a cross-sectional view that illustrates how a 3D image is displayed by a display device according to an exemplary embodiment.

FIG. 2 is a cross-sectional view that illustrates how a 3D image is displayed by a display device according to an exemplary embodiment.

Referring to FIG. 2, according to an embodiment, a non-emission portion BL at which no image is displayed is positioned between adjacent pixels PX of the display unit 100. The non-emission portion BL may be, e.g., a black matrix or a pixel defining layer that defines a region of pixels, and has a periodic shape such as a lattice in the display area. Hereinafter, a structure at a position where the pixels PX are arranged is referred to as a planar structure.

According to embodiments, the second lens array unit 200 includes a plurality of lenses 210. Each of the lenses 210 is positioned to correspond to one pixel PX, and a center of each of the lenses 210 substantially coincides with, or is slightly shifted from, a center of the corresponding pixel PX.

According to embodiments, a pitch in one direction of the lenses 210 is equal to or less than a pitch of the pixels PX in the same direction. In other words, a width in one direction of each lens 210 is substantially equal to or less than a width of each pixel PX in the same direction. Each of the lenses 210 may be a convex lens, but embodiments of the present disclosure are not limited thereto. For example, the lenses may be concave lenses.

According to embodiments, the first lens array unit 300 includes a plurality of lenses 310. Each of the lenses 310 overlaps at least two of the pixels of the display unit 100. Light of images displayed by the pixels PX that overlap each of the lenses 310 propagates through the corresponding lens 210 of the second lens array unit 200, and then into the corresponding lens 310 of the first lens array unit 300.

According to embodiments, light propagating through each of the lenses 310 is refracted in different directions depending on the positions and incidence angles of the light propagating into the respective lenses 310. Accordingly, light emitted from one pixel PX can be observed at different viewpoints VP1-VPn of the observation position OVD, and the pixels PX corresponding to respective lenses 310 can display images corresponding to all the viewpoints VP1-VP8, a phenomenon referred to as light field generation. In FIG. 2, the numbers displayed under the respective pixels PX of the display unit 100 indicate the viewpoints VP1-VP8 corresponding to the pixels PX. For example, a pixel PX corresponding to the number "8" is a pixel that corresponds to viewpoint VP8. Although eight viewpoints VP1-VP8 are illustrated in FIG. 2, the number of the viewpoints is not limited thereto.

According to embodiments, the number of the lenses 210 corresponding to one lens 310 is equal to the number of the pixels PX that correspond to that lens 310.

Figure 3:
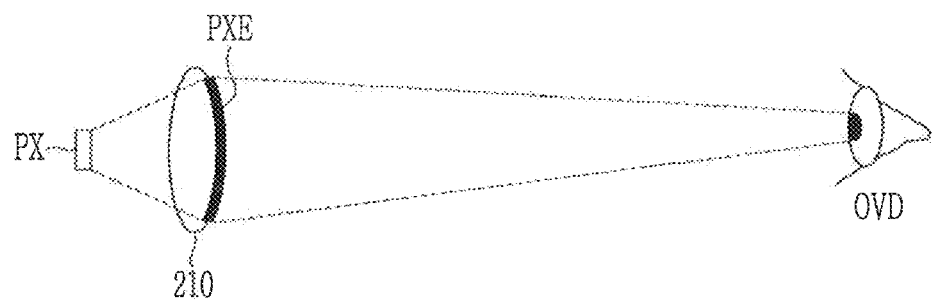
FIG. 3 and FIG. 4 illustrate how a pixel is enlarged and viewed by a lens of a second lens array unit of a display device according to an exemplary embodiment.
Figure 4:
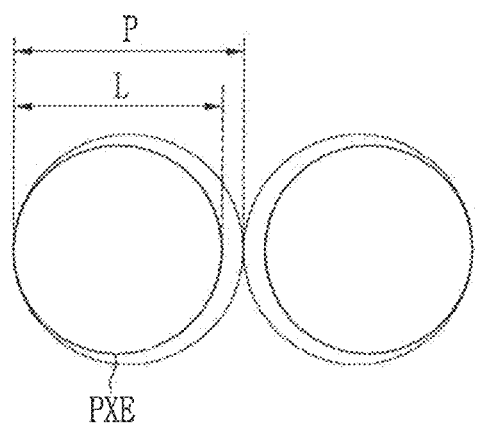

According to embodiments, the second lens array unit 200 serves to increase the angular distribution of the light emitted from the pixels PX of the display unit 100 and propagating to the first lens array unit 300. Referring to FIG. 3 and FIG. 4, light emitted from respective pixels PX is refracted in the corresponding lens 210, and thus enlarged pixel images PXE created by light from the pixels PX can be observed at the observation position OVD. Accordingly, it is possible to increase a ratio of a width L of the enlarged pixel images PXE observed at the observation position OVD to a pitch P of the pixels PX. In FIG. 3, the first lens array unit 300 and the resulting light path changes are not shown for convenience.

As such, according to embodiments, the lenses 210 of the second lens array unit 200 have an effect of substantially enlarging the pixels PX. Accordingly, a ratio of the enlarged pixel images PXE can be increased as compared with an actual ratio of the pixels PX to the pitch P of the pixels PX when the light of the pixels PX directly propagates to the first lens array unit 300 without the second lens array unit 200. As a result, a ratio, referred to herein as a fill factor, of a portion at which actual effective images are displayed to a whole region observed at the observation position OVD can be increased. In other words, the fill factor can be improved by reducing a region between adjacent pixels PX in which the non-emission portion BL is visible and by expanding a region in which images displayed by the pixels PX are visible.

This effect will be described with reference to FIG. 5 to FIG. 11 by comparison to a comparative example.

Figure 5:
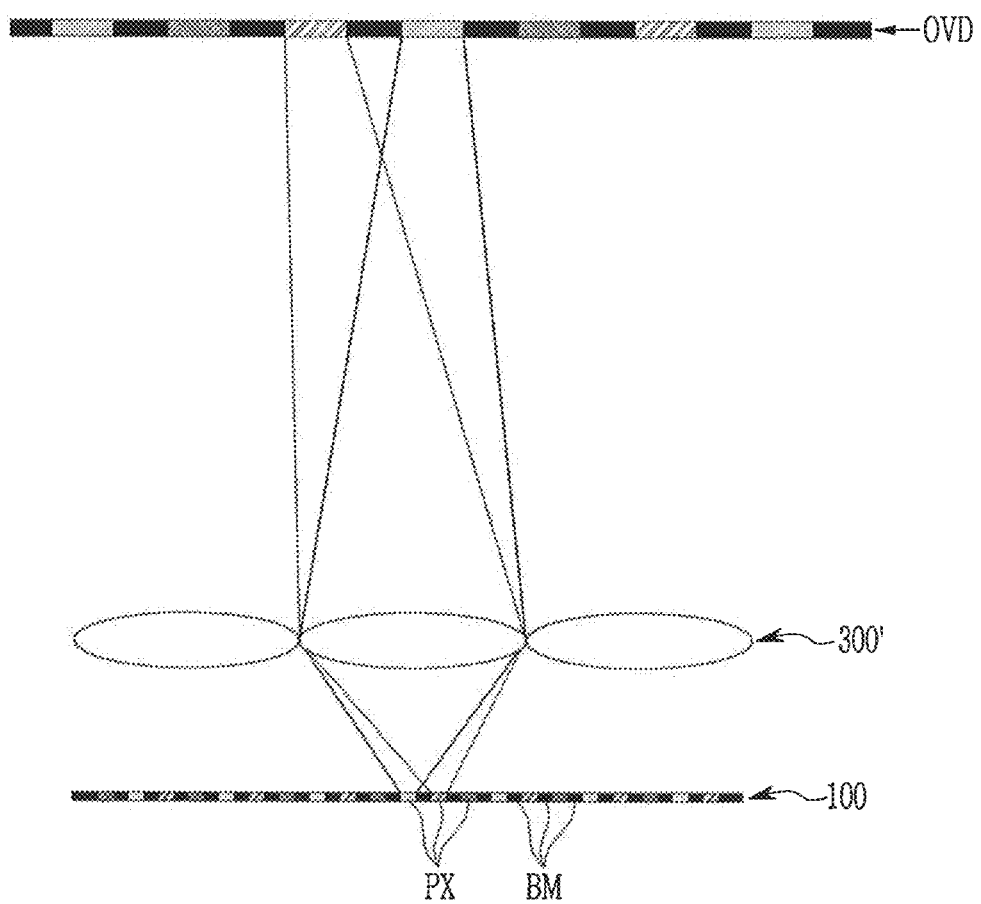
FIG. 5 is a cross-sectional view that illustrates how a 3D image is displayed by a display device according to a comparative example.
Figure 6:
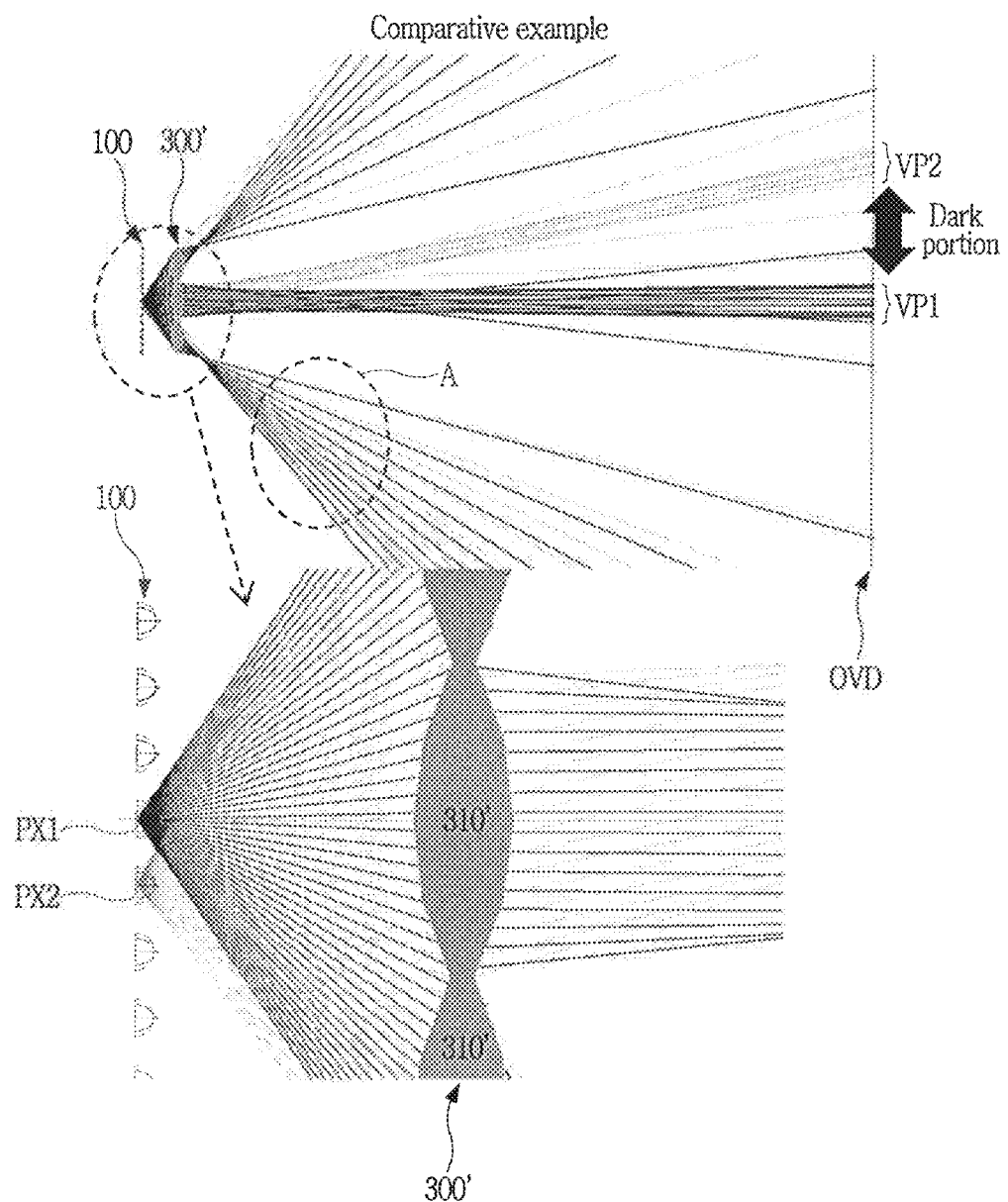
FIG. 6 is a cross-sectional view that illustrates a method for displaying a 3D image by a display device according to a comparative example.

Referring to FIG. 5 and FIG. 6, according to embodiments, when light of images from the display unit 100 is directly propagates into and is refracted by a first lens array unit 300' and is observed at the observation position OVD, the non-emission portions BL, like the pixels PX, are also observed at the observation position OVD through the first lens array unit 300' and seen as a dark portion of a relatively large area. As a result, a moiré pattern is generated by interference between a periodic shape of the non-emission portion BL observed at the observation position OVD and a periodic shape of the first lens array unit 300, which deteriorates the image quality.

In addition, as illustrated in FIG. 6, according to embodiments, widths of regions of the viewpoints VP1 and VP2 are reduced by a region of the visible dark portion. Light emitted from the respective pixels PX1 and PX2 not only propagates through a corresponding lens 310' but also leaks to the adjacent lens 310'. As a result, the intensity of light propagating to the respective viewpoints VP1 and VP2 is reduced, and light leaking into the adjacent lens 310' may be visible as a flipping image, which further deteriorates the image quality, as indicated by "A" in FIG. 6.

Figure 7:
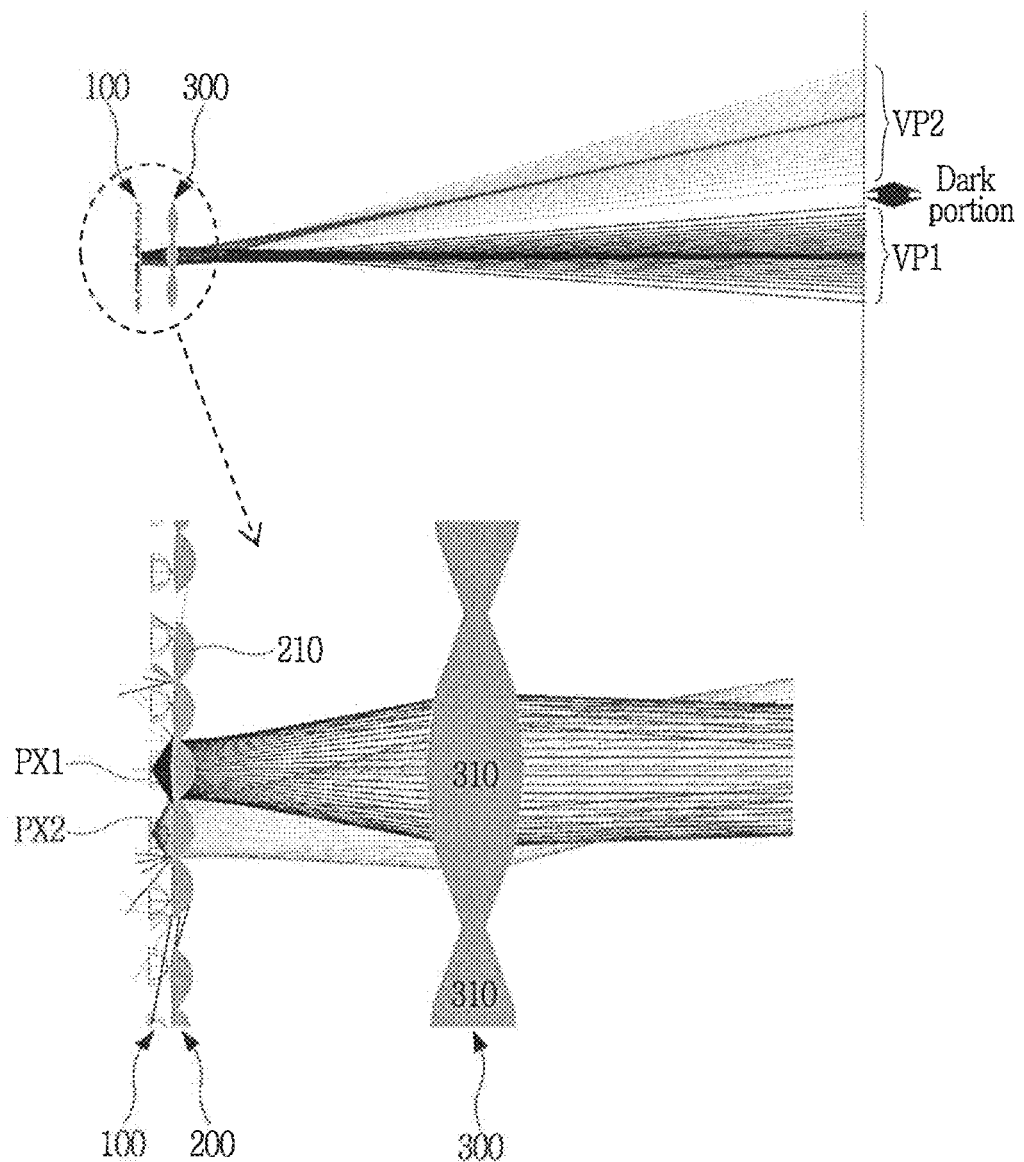
FIG. 7 is a cross-sectional view that illustrates how a 3D image is displayed by a display device according to an example.

In contrast, according to embodiments, referring to FIG. 7 together with the aforementioned FIG. 2, only images of the pixels PX are enlarged by the respective lenses 210 of the second lens array unit 200, and light from the pixels propagates to and is refracted by the first lens array unit 300 to be observed. Accordingly, most of the non-emission portion BL is not visible at the observation position OVD. As a result, the strength and extents of the moiré pattern can be reduced without modifying the structure of the display unit 100, and the quality of the 3D images can be improved by increasing a fill factor of the pixels PX in the entire observed image.

In addition, according to embodiments, referring to FIG. 7 and comparing it with FIG. 6, a region of the dark portion is reduced to increase regions of the respective viewpoints VP1 and VP2, and most light emitted from the respective pixel PX1 and PX2 propagates through the corresponding lens 310' without leakage to the adjacent lens 310', which increases the intensity of light at the viewpoints VP1 and VP2. In addition, unlike in the comparative example, a flipping image is not visible, which also improves image quality.

The distribution of light at each position at the observation position OVD and effects of the examples will be described through simulation results with reference to FIG. 8 to FIG. 11.

Figure 8:
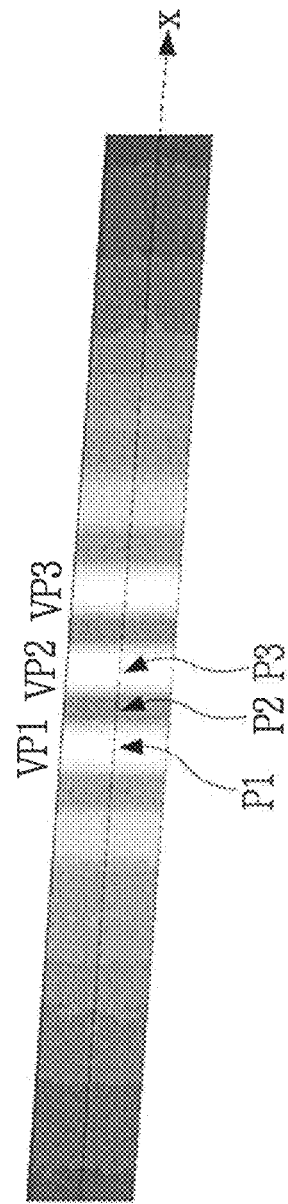
FIG. 8 shows a simulation result that illustrates an image displayed at an observation position by a display device according to a comparative example.

FIG. 8 illustrates the light intensity distribution on an x-axis direction at the observation position OVD as a simulation result based on the comparative example shown in FIG. 5 and FIG. 6 described above, and FIG. 9 illustrates the light intensity distribution on the x-axis direction at the observation position OVD as a simulation result based on another example. The x-axis direction is a direction along which the viewpoints VP1, VP2, and VP3 are arranged at the observation position OVD.

Figure 10:
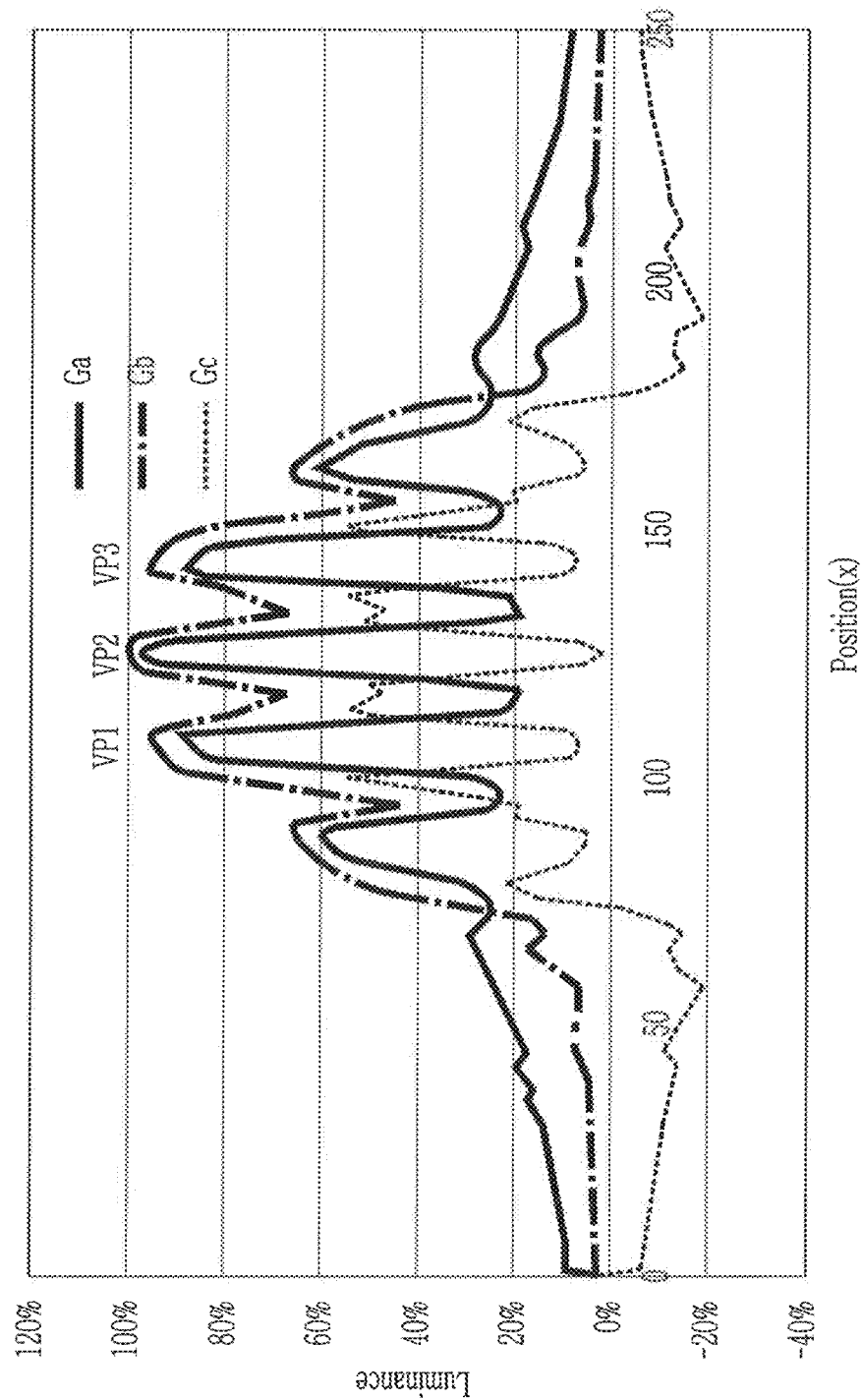
FIG. 10 is a graph that illustrates how luminance changes as a function of position in an image shown in FIG. 8 and FIG. 9.

FIG. 10 illustrates a first curve Ga that shows a change in the light intensity distribution of FIG. 8 according to the comparative example, i.e., luminance (%) as a function of an x-axis position, a second curve Gb that shows a change in the light intensity distribution of FIG. 8 according to another example, i.e., luminance (%) as a function of an x-axis position, and a third curve Gc that shows a difference between the two curves Ga and Gb.

Referring to the second curve Gb, it can be seen that the luminance at the respective viewpoints VP1, VP2, and VP3 is increased by, e.g., substantially 4% to 10%, as compared with the comparative example of the first curve Ga, and the widths of the respective viewpoints VP1, VP2, and VP3 are also increased. In addition, referring to the second curve Gb, it can be seen that the luminance of the regions between the adjacent viewpoints VP1, VP2, and VP3 is also increased by, e.g., substantially 50%, and widths thereof are reduced, to significantly reduce the dark portion, unlike in the comparative example. Moreover, referring to the second curve Gb, it can be seen that the luminance of regions external to the corresponding viewpoints VP1, VP2, and VP3 is significantly reduced as compared with the comparative example, such that light leaks to the adjacent lens 310, and thus the light that generates the flipping image, are significantly reduced by, e.g., substantially 6% to 20%.

Figure 9:
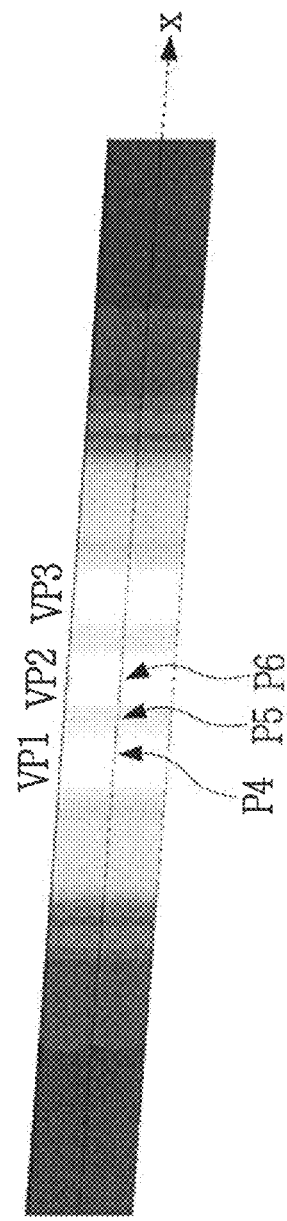
FIG. 9 shows a simulation result that illustrates an image displayed by a display device according to another example.
Figure 11:
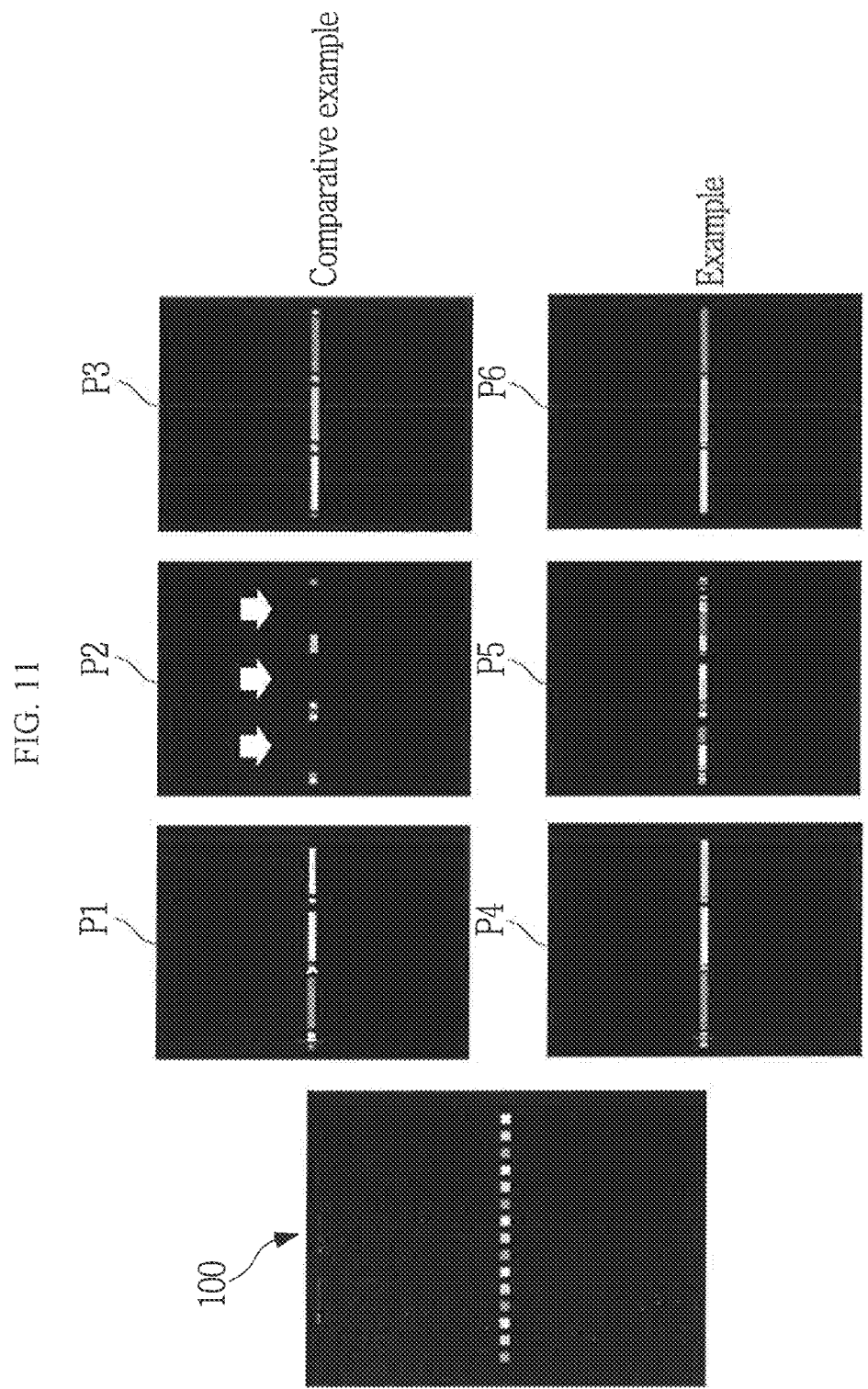
FIG. 11 shows simulation results that illustrate an image displayed at an observation position by a display device according to a comparative example and another example.

FIG. 11 illustrates a simulation result that shows in the upper part of the figure images viewed at three points P1, P2, and P3 of FIG. 8 based on the comparative example and, in the lower part of the figure, images viewed from three points P4, P5, and P6 of FIG. 9 based on another example, along with, at the left side of the figure, an image displayed by the display unit 100.

Referring to FIG. 11, comparing another example with the comparative example, widths of images of the pixels PX viewed at the points P4 and P5 that correspond to centers of the respective viewpoints VP1 and VP2 are wider and more distinct, and images of adjacent pixels that correspond to regions between the adjacent viewpoints VP1 and VP2 can be viewed at point P5. Accordingly, it can be seen that a width of the dark portion is significantly reduced.

Hereinafter, a detailed structure of a display device according to an exemplary embodiment will be described with reference to FIG. 12 to FIG. 14 together with the aforementioned drawings. The same constituent elements as in the exemplary embodiments described above are designated by the same reference numerals, and duplicated descriptions thereof are omitted.

Figure 12:
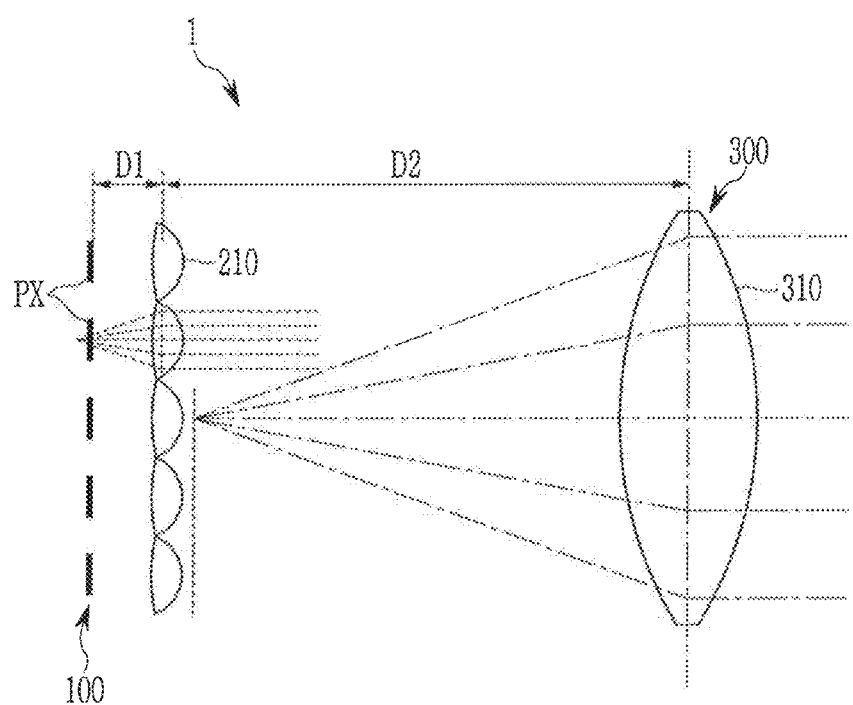
FIG. 12, FIG. 13, and FIG. 14 illustrate a position relationship between a display unit, a first lens array unit, and a second lens array unit of a display device according to an exemplary embodiment.

Referring to FIG. 12, in a display device 1 according to a present exemplary embodiment, a shortest distance D1 between the display unit 100 and a center of the lenses 210 of the second lens array unit 200 is defined in Equation 1 when a focal distance of the lenses 210 included in the second lens array unit 200 is represented as f2.

$$f2 \times 0.5 \leq D1 \leq f2 \times 1.5 \qquad \text{Equation 1:}$$

In addition, a shortest distance D2 between the center of the lenses 210 of the second lens array unit 200 and a center of the lenses 310 of the first lens array unit 300 is defined in Equation 2 when a focal distance of the lenses 310 included in the first lens array unit 300 is represented as f1.

$$f1 \times 0.5 \leq D2 \leq f1 \times 1.5 \qquad \text{Equation 2:}$$

FIG. 12 illustrates a case in which the shortest distance D1 between the display unit 100 and the center of the lenses 210 of the second lens array unit 200 is slightly less than the focal distance f2 of the lenses 210, and the shortest distance D2 between the center of the lenses 210 of the second lens array unit 200 and the center of the lenses 310 of the first lens array unit 300 is slightly greater than the focal distance f1 of the lenses 310 of the first lens array unit 300.

Figure 13:
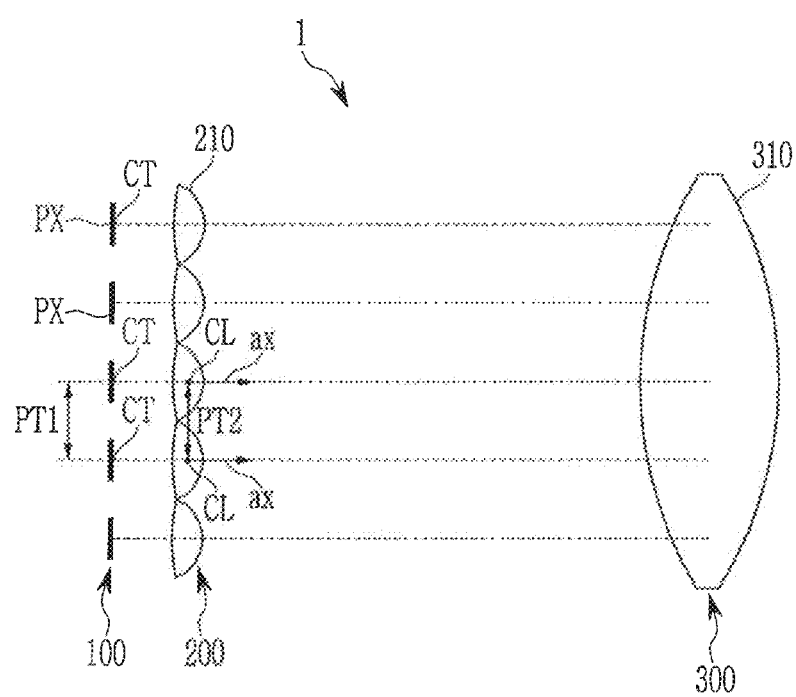

Referring to FIG. 13, according to an embodiment, a pitch PT2 of the lenses 210 of the second lens array unit 200 is substantially equal to a pitch PT1 of the pixels PX of the display unit 100, while a pitch of the lenses 310 of the first lens array unit 300 is greater than the pitch PT2 of the lenses 210 of the second lens array unit 200, and is an integer multiple of the pitch PT2 of the lenses 210. Herein, the pitch of the lenses 310 is equal to a width of the respective lenses 310. Similarly, the pitch PT2 of the lenses 210 is substantially equal to the width of the respective lenses 210. In this case, the width of the lens 310 of the first lens array unit 300 is greater than the width of the lenses 210 of the second lens array unit 200, and is substantially an integer multiple of the width of the lenses 210.

As shown in FIG. 13, according to an embodiment, straight lines connecting centers CT of the respective pixels PX and centers CL of the lenses 210 corresponding to the pixels PX are parallel with optical axes ax of the respective lenses 210. As a result, the straight lines connecting centers CT of the respective pixels PX and centers CL of the lenses 210 are substantially parallel with each other. The optical axes ax of the respective lenses 210 pass through the centers CL of the corresponding lenses 210. Accordingly, light emitted from the pixels PX corresponding to one lens 310 of the first lens array unit 300 propagates through respective lenses 210 of the second lens array unit 200 substantially parallel with each other, and propagates to different positions on a curved surface of the lens 310 of the first lens array unit 300.

Figure 14:
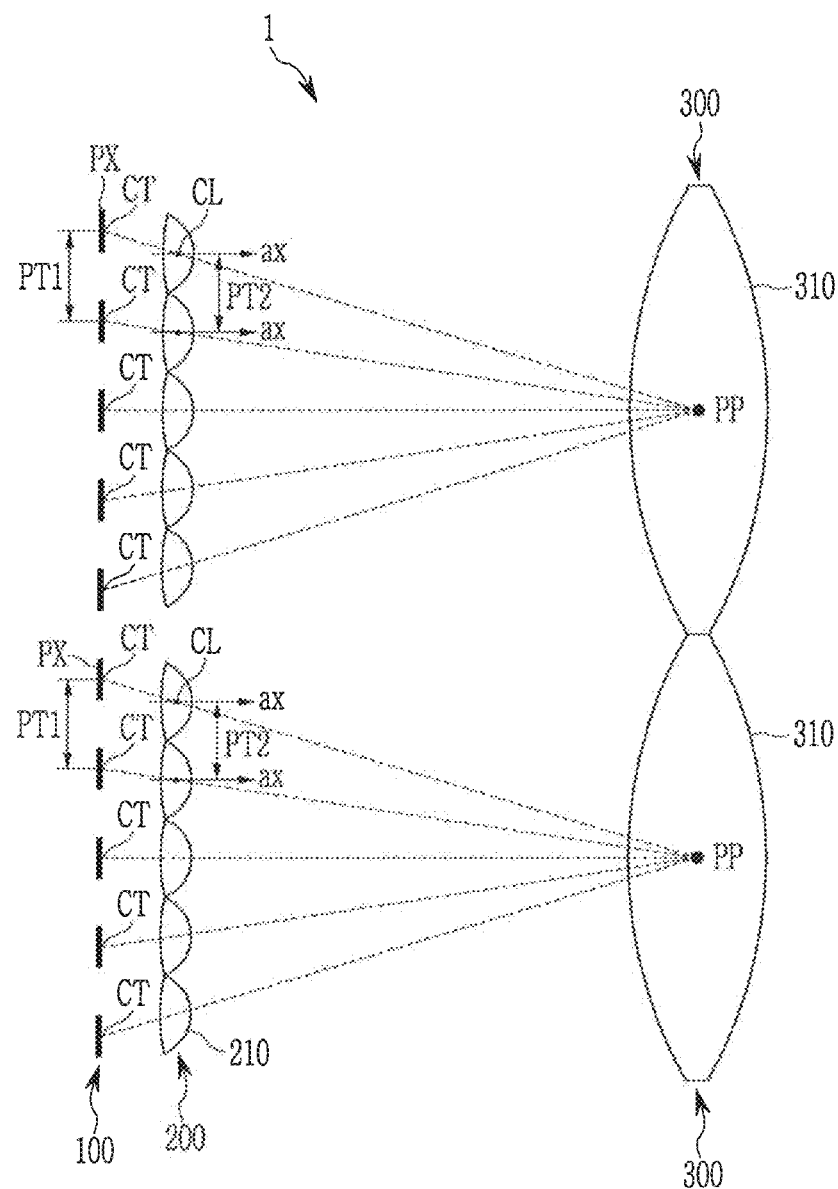

Referring to FIG. 14, according to an embodiment, the number of lenses 210 that correspond to and face one lens 310 is equal to the number of pixels PX that correspond to and face one lens 310. However, the pitch PT2 of the lenses 210 corresponding to one lens 310 is less than the pitch PT1 of the pixels PX of the display unit 100, while a pitch of the lenses 310 of the first lens array unit 300 is greater than the pitch PT2 of the lenses 210 of the second lens array unit 200, and is an integer multiple of the pitch PT2 of the lenses 210.

According to an embodiment, the center CL of a lens 210 that corresponds to one lens 310, or is nearest thereto among the lenses 210 corresponding to the lens 310, is substantially aligned with the center CT of the corresponding pixel PX.

According to an embodiment, the lens 210 corresponding to one lens 310 of the first lens array unit 300 is separated from the lens 210 corresponding to the adjacent lens 310, and a separation distance is greater than the pitch PT1 of the pixels PX.

According to an embodiment, straight lines that connect centers CT of the respective pixels PX and centers CL of the lenses 210 corresponding to the pixels PX are not parallel with optical axes ax of the respective lenses 210. As shown in FIG. 14, the straight lines connecting centers CT of the respective pixels PX and centers CL of the lenses 210 may converge on one point PP instead of being parallel with each other. The point PP is positioned in a lens 310 of the first lens array unit 300, and corresponds to the center of the lens 310. Accordingly, light emitted from the pixels PX that correspond to one lens 310 of the first lens array unit 300 first propagate through the lenses 210 of the second lens array unit 200 and then propagate toward the point PP and into a more limited portion of a region on the curved surface of the lens 310 than the example illustrated in FIG. 13. As a result, light emitted from the pixels PX that correspond to one lens 310 propagate through a portion in the region on the curved surface of the lens 310 that is close to the center of the lens 310, and thus 3D images can be viewed more distinctly.

Hereinafter, a planar structure of a display device according to an exemplary embodiment will be described with reference to FIG. 15 to FIG. 21 together with the aforementioned drawings.

Figure 15:
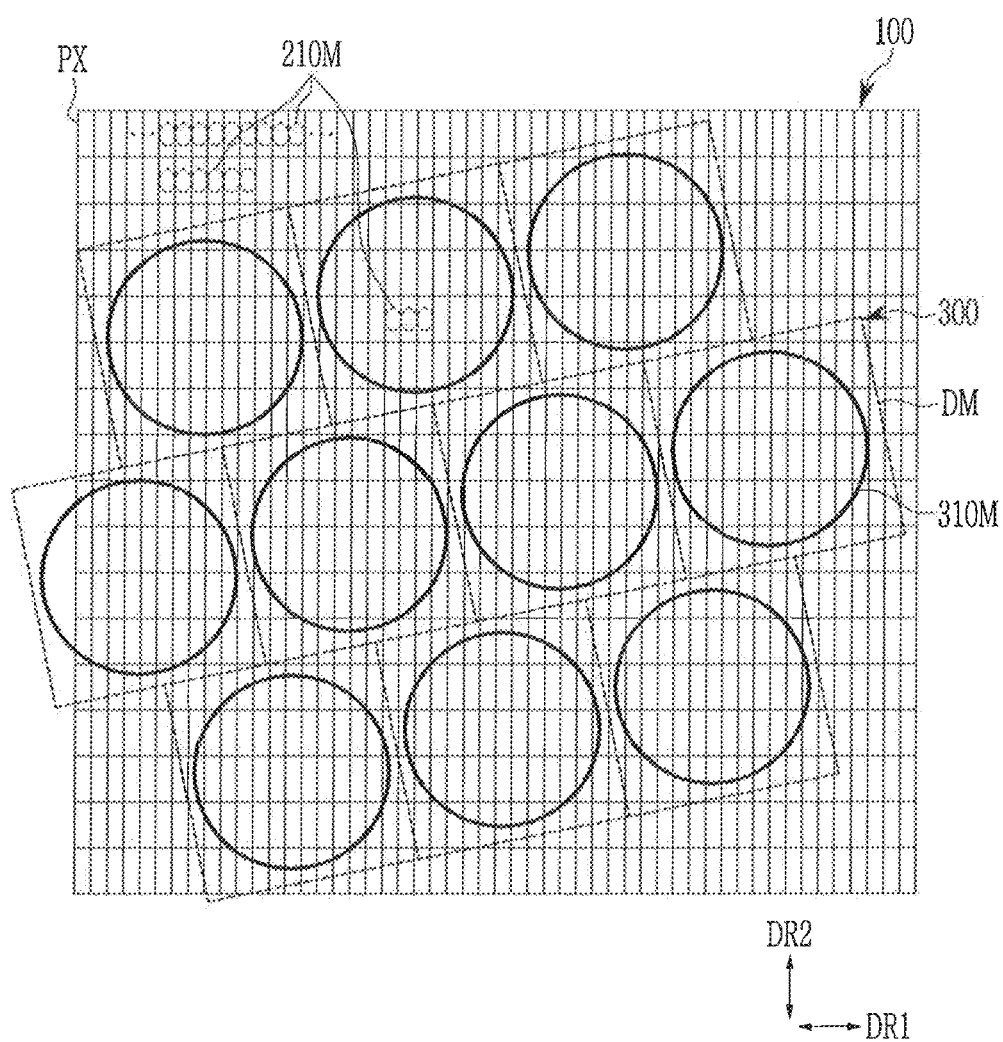
FIG. 15, FIG. 16, FIG. 17, FIG. 18, FIG. 19, FIG. 20, and FIG. 21 are layout views that illustrate a plurality of pixels and a lens array unit of a display device according to an exemplary embodiment.

Referring to FIG. 15, according to an embodiment, the aforementioned second lens array unit 200 includes a plurality of microlenses 210M. The microlenses 210M are disposed to overlap the corresponding pixels PX.

According to embodiments, the first lens array unit 300 includes a plurality of microlenses 310M. The first lens array unit 300 is divided into a plurality of domains DM, and one microlens 310M is disposed in each of the domains DM. The domains DM may have one of various polygonal shapes, and FIG. 15 illustrates an example in which each of the domains DM has a rectangular shape. Each of the domains DM overlaps two or more pixels PX, and light emitted from pixels PX that correspond to a respective domain DM are refracted in different directions depending on the position of the microlens 310M disposed in each of the domains DM, so that images of each of the pixels PX can be visible at different viewpoints. The shape and disposal of the domains DM can be variously modified without being limited to those shown therein.

According to embodiments, the pixels PX of the display unit 100 are arranged in a substantially matrix form along a first direction DR1 and a second direction DR2, and the domains DM or microlenses 310M of the first lens array unit 300 are obliquely inclined with respect to the first direction DR1 and the second direction DR2, as illustrated therein. Alternatively, the domains DM or microlenses 310M may be arranged in directions that are substantially parallel with the first or second directions DR1, DR2.

Figure 16:
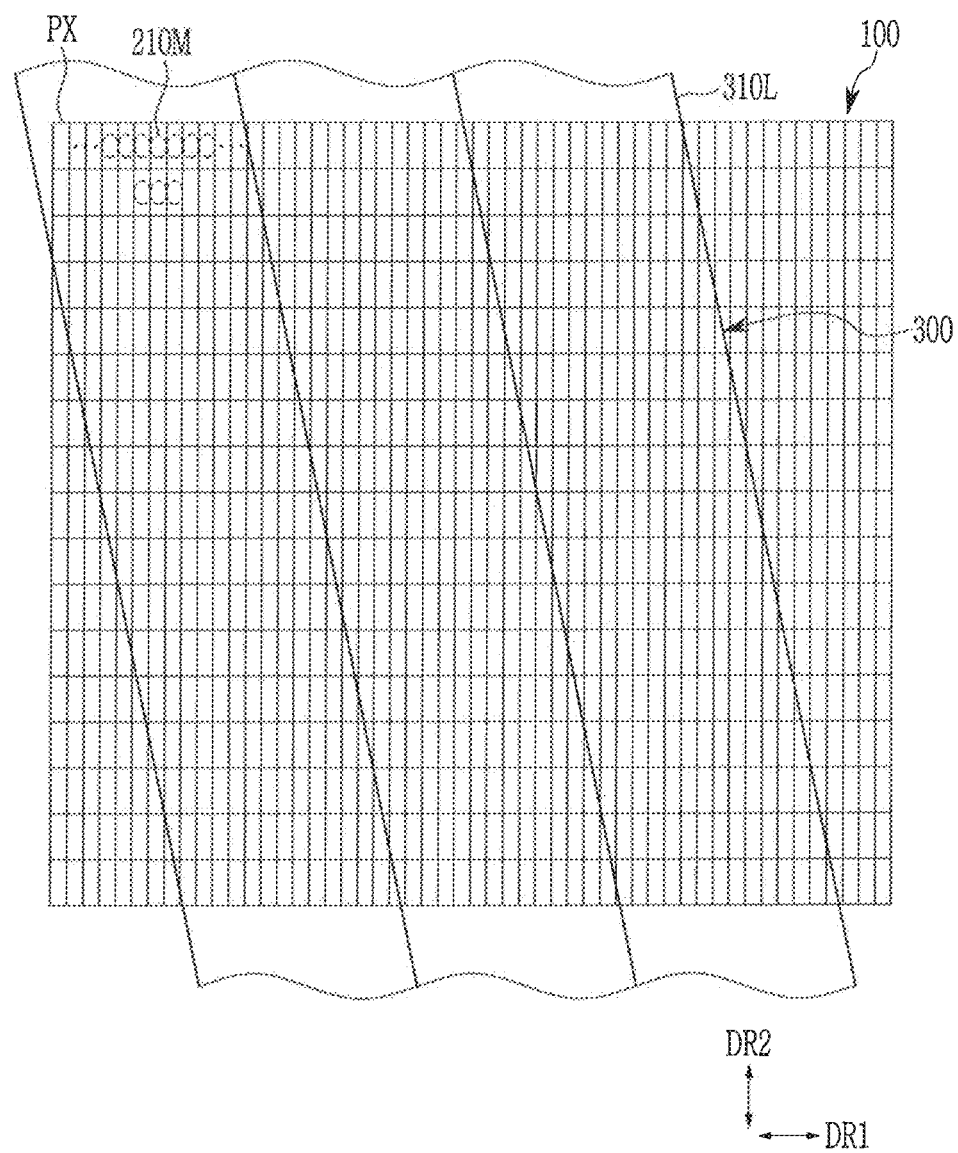

Next, referring to FIG. 16, a present exemplary embodiment is substantially the same as an aforementioned exemplary embodiment of FIG. 15. However, the first lens array unit 300 includes a plurality of lenticular lenses 310L instead of microlenses. Each of the lenticular lenses 310L, as illustrated therein, extends in a direction that is obliquely inclined with reference to the first direction DR1 and the second direction DR2. Alternatively, the extending direction of the lenticular lenses 310L may be substantially parallel to the second direction DR2.

Figure 17:
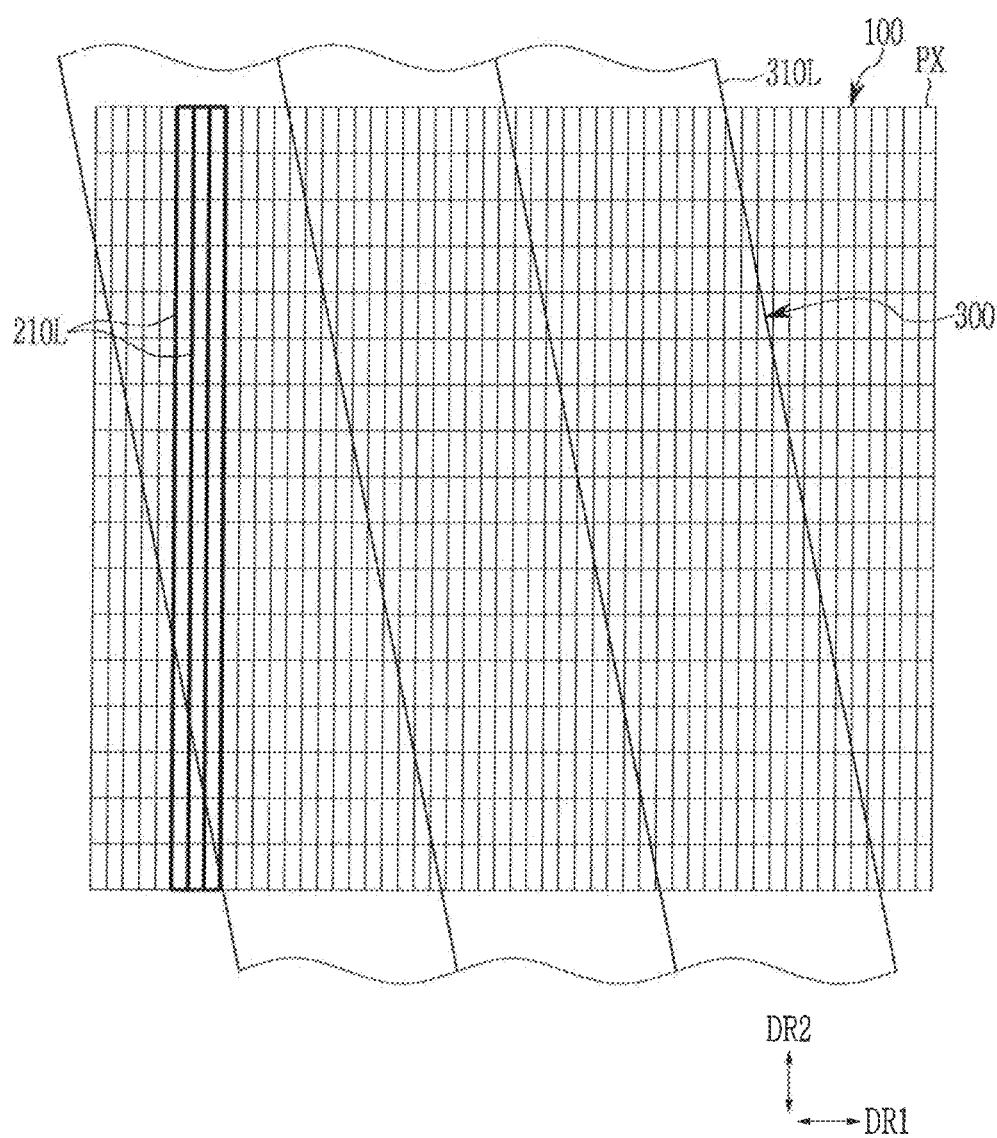

Next, referring to FIG. 17, a present exemplary embodiment is substantially the same as an aforementioned exemplary embodiment of FIG. 16. However, the second lens array unit 200 includes a plurality of lenticular lenses 210L instead of microlenses. Each of the lenticular lenses 210L extends parallel with rows or columns of the pixels PX, and overlaps one pixel row or one pixel column. However, unlike in FIG. 17, if the pixels PX are regularly arranged in another direction, the lenticular lenses 210L extend in a direction that differs from the first and second directions DR1 and DR2.

Figure 18:
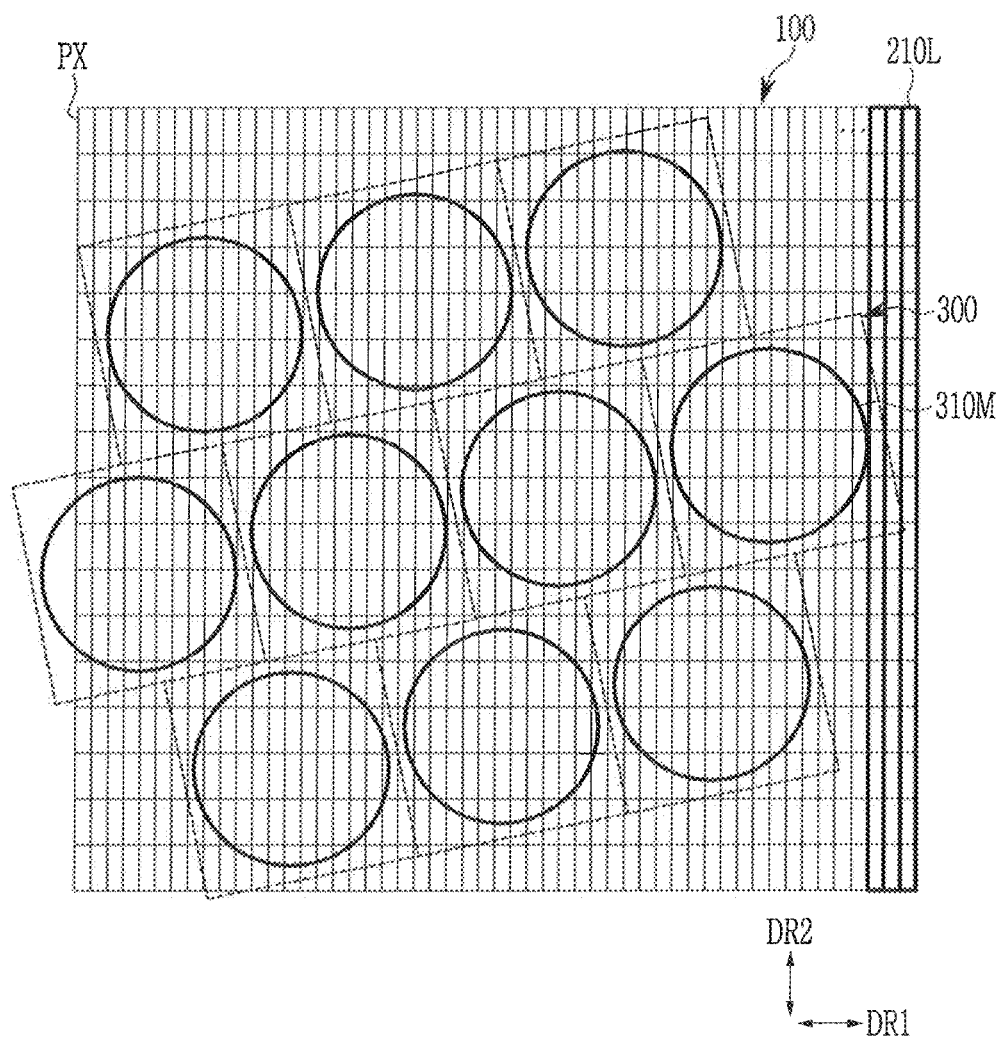

Next, referring to FIG. 18, a present exemplary embodiment is substantially the same as an aforementioned exemplary embodiment of FIG. 17. However, the first lens array unit 300 includes a plurality of microlenses 310M instead of the lenticular lenses. The features of the first lens array unit 300 are the same as those of an aforementioned exemplary embodiment of FIG. 15.

Figure 19:
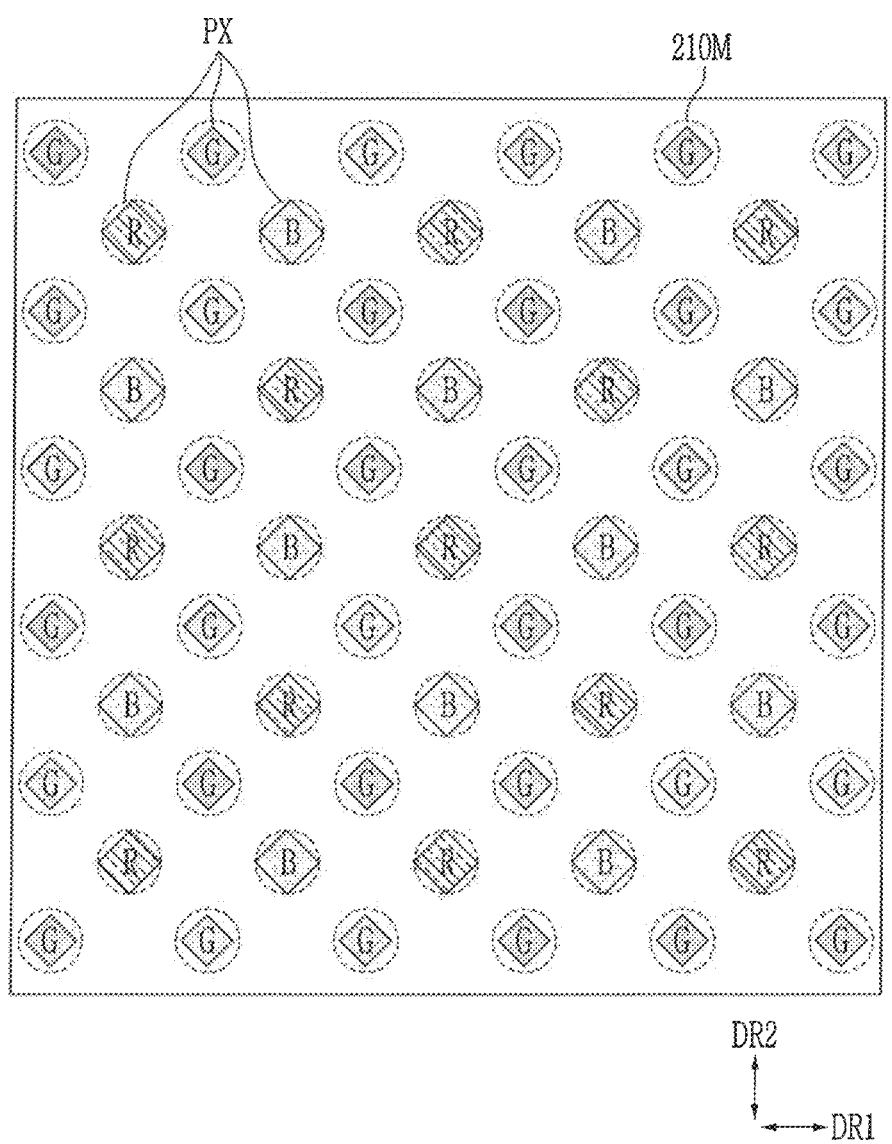

Next, referring to FIG. 19, a present exemplary embodiment is substantially the same as an aforementioned exemplary embodiment of any of FIG. 15 to FIG. 18. However, the pixels PX of the display unit 100 are disposed differently. For example, the pixels PX may be arranged in a pentile matrix structure. Specifically, red pixels R and blue pixels B may be alternately disposed in a first direction DR1 and a second direction DR2, the red pixels R and green pixels G may be alternately disposed in a diagonal direction, and the blue pixels B and the green pixels G may be alternately disposed in another diagonal direction. The red pixels R are equal to or slightly smaller in size that the blue pixels B, and the green pixels G are smaller than the red pixels R and the blue pixels B.

According to an embodiment, the microlens 210M of the second lens array unit 200 are disposed to correspond to the pixels PX, and although not illustrated, the first lens array unit 300 may include a plurality of microlens or a plurality of lenticular lens that overlap the pixels PX and the microlens 210M, as in an exemplary embodiment of any of FIG. 15 to FIG. 18.

Figure 20:
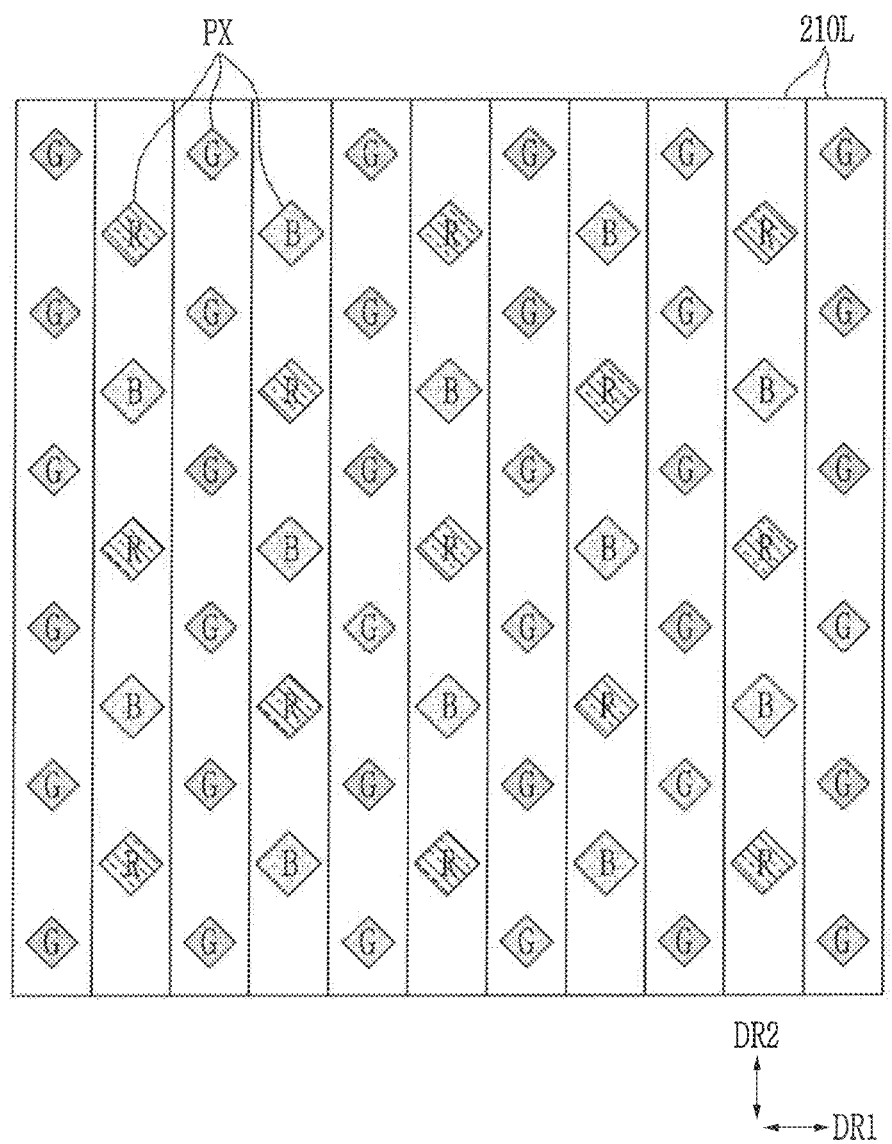

Next, referring to FIG. 20, a present exemplary embodiment is substantially the same as an aforementioned exemplary embodiment of FIG. 19. However, the second lens array unit 200 includes a plurality of lenticular lenses 210L instead of the microlenses. Each of the lenticular lenses 210L, as illustrated therein, extend in the second direction DR2 to overlap a pixel column in which the red pixels R and the blue pixels B are alternately disposed, or a pixel column in which the green pixels G are disposed.

Figure 21:
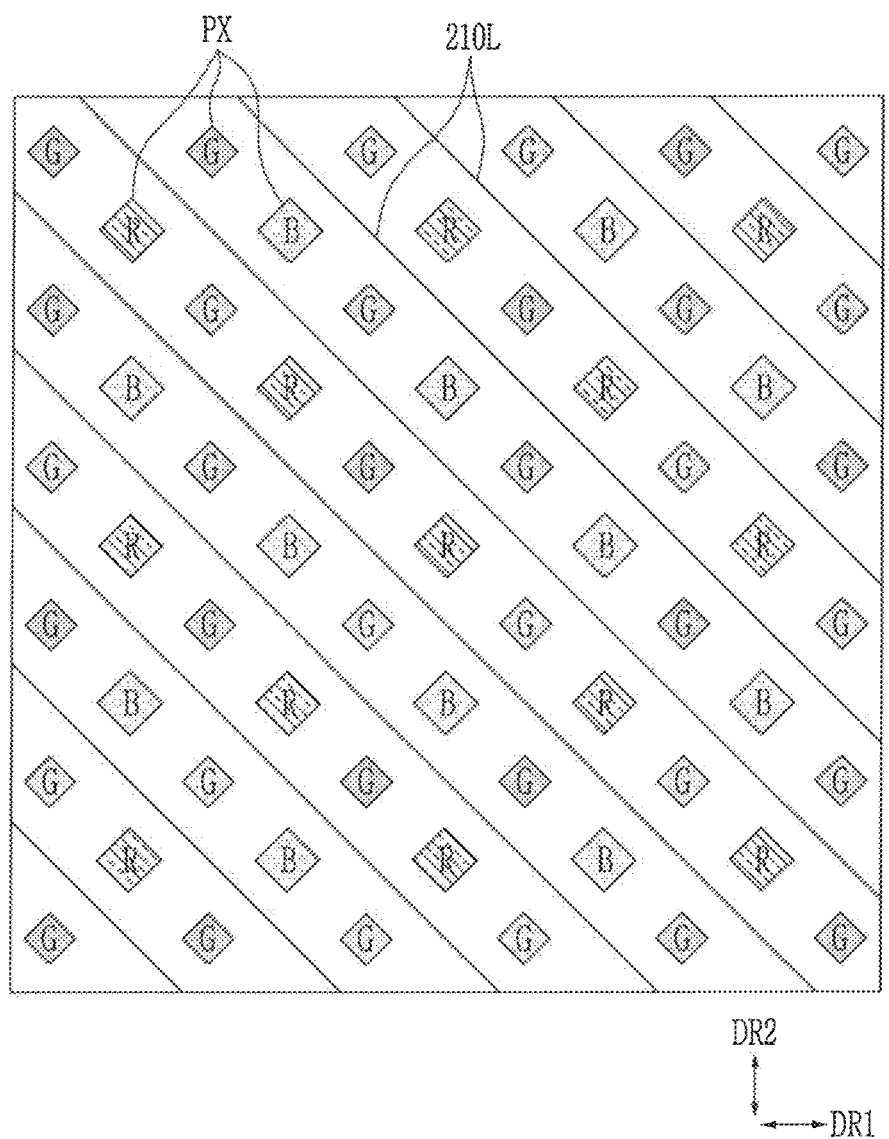

Next, referring to FIG. 21, a present exemplary embodiment is substantially the same as an aforementioned exemplary embodiment of FIG. 20. However, each of the lenticular lenses 210L of the second lens array unit 200 extends in a diagonal direction that is inclined with respect to the first direction DR1 and the second direction DR2, to overlap a column in which the red pixels R and the green pixels G are alternately disposed, or a column in which the blue pixels B and the green pixels G are alternately disposed.

Hereinafter, a planar structure of a display device according to an exemplary embodiment will be described with reference to FIG. 22 to FIG. 25 together with the aforementioned drawings.

Figure 22:
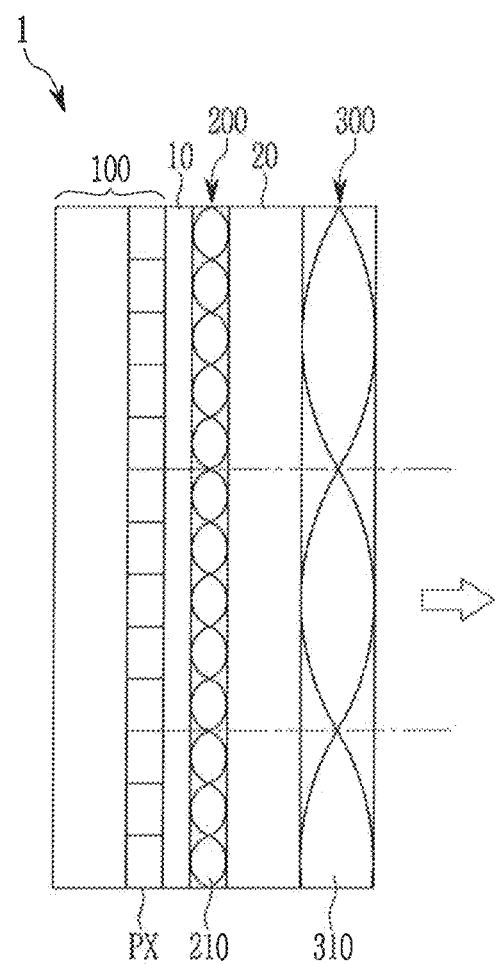

Referring to FIG. 22, in the display device 1 according to a present exemplary embodiment, a first interlayer 10 is disposed between the display unit 100 and the second lens array unit 200, and a second interlayer 20 is disposed between the second lens array unit 200 and the first lens array unit 300. In FIG. 22, a right arrow indicates a direction in which an image is displayed.

According to embodiments, when the second lens array unit 200 is disposed on the display unit 100 using a same process as that used to manufacture the display unit 100, the first interlayer 10 is a transparent insulating layer that is stacked first on the display unit 100.

According to embodiments, when the second lens array unit 200 has a lens-sheet shape, the lenses 210 can be directly formed on the display unit 100 or the first interlayer 10 using various methods, such as imprinting, inkjet printing, etc., and the first interlayer 10 is included as a base layer of the second lens array unit 200. As a result, the first interlayer 10 is a part of the second lens array unit 200.

In this case, according to an embodiment, no additional adhesive member is required between the display unit 100 and the second lens array unit 200.

Similarly, according to an embodiment, when the first lens array unit 300 is formed on the second lens array unit 200 using a same process as that used to manufacture the display unit 100, the second interlayer 20 is a transparent insulating layer that is stacked first on the second lens array unit 200.

According to an embodiment, when the first lens array unit 300 has a lens-sheet shape, lenses 310 of the first lens array unit 300 can be directly formed on the second lens array unit 200 or the second interlayer 20 using various methods, such as imprinting, inkjet printing, etc., and the second interlayer 20 is included as a base layer of the first lens array unit 300. As a result, the second interlayer 20 is a part of the first lens array unit 300. In this case, no additional adhesive member is required between the second lens array unit 200 and the first lens array unit 300.

According to an embodiment, a material that has a high transmittance and substantially no influence on the refractive index is used as a material for the first interlayer 10 and the second interlayer 20. For example, the material of the first interlayer 10 and the second interlayer 20 may include an acryl-based polymer, a silicone-based polymer, or a urethane-based polymer, but embodiments of the present disclosure are not limited thereto. Various other transparent insulating materials may be used.

According to an embodiment, when the second lens array unit 200 is manufactured as a separate panel and then attached to the display unit 100, the first interlayer 10 includes an optical adhesive material that adheres the display unit 100 and the second lens array unit 200 to each other. For example, the first interlayer 10 may include an optically clear resin (OCR) or an optically clear adhesive (OCA).

Similarly, according to an embodiment, when the first lens array unit 300 is manufactured as a separate panel and then attached to the second lens array unit 200, the second interlayer 20 includes an optical adhesive material that adheres the second lens array unit 200 and the first lens array unit 300. For example, the second interlayer 20 may include an optically clear resin (OCR) or an optically clear adhesive (OCA).

According to an embodiment, a distance between the display unit 100 and the second lens array unit 200 can be controlled by adjusting the thickness of the first interlayer 10, and a distance between the second lens array unit 200 and the first lens array unit 300 can be controlled by adjusting the thickness of the second interlayer 20.

According to an embodiment, at least one of the first lens array unit 300 and the second lens array unit 200 can be a lens sheet in which a plurality of lenses are arranged.

Figure 23:
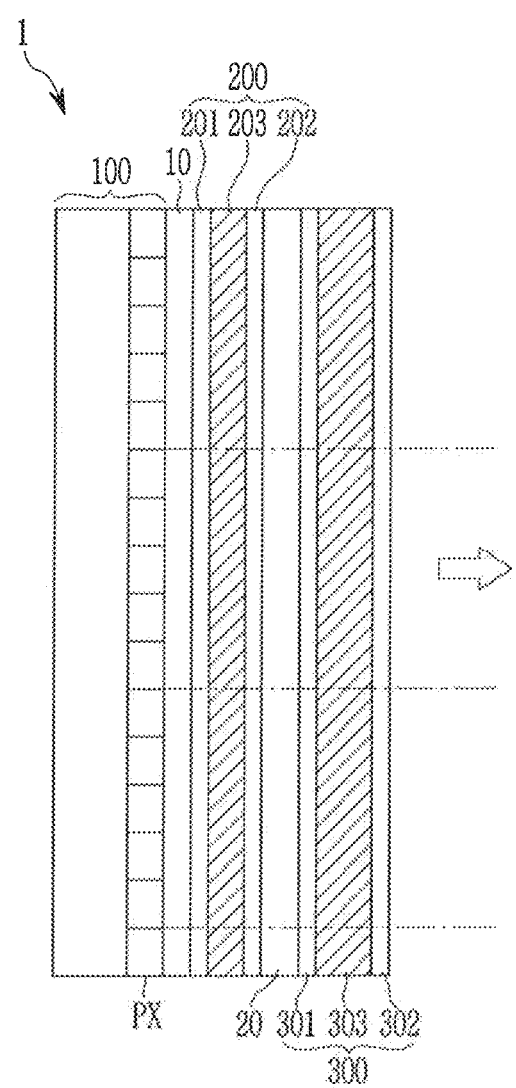

Next, referring to FIG. 23, a present exemplary embodiment is substantially the same as an aforementioned exemplary embodiment of FIG. 22. However, at least one of the first lens array unit 300 or the second lens array unit 200 is a switchable light modulation unit. FIG. 23 illustrates an example in which both of the first lens array unit 300 and the second lens array unit 200 are switchable light modulation units, which can be switched on or off.

According to an embodiment, the second lens array unit 200 includes two substrates 201 and 202 which face each other, and a light modulation layer 203 disposed therebetween. An electrode capable of generating an electric field in the light modulation layer 203 is formed in at least one of the two substrates 201 and 202. The light modulation layer 203 may include, e.g., a liquid crystal layer. When the second lens array unit 200 is turned on, an electric field is generated inside the light modulation layer 203 such that liquid crystal molecules are rearranged to form a refractive index distribution that changes as a function of position. As a result, a lens can be formed for each unit region of the light modulation layer 203 that subjects light incident to the light modulation layer 203 to a phase delay that changes as a function of position. As such, when turned on, the light modulation layer 203 forms a lens for each pixel PX of the display unit 100. When the light modulation layer 203 is turned off, incident light propagates through the second lens array unit 200 without any phase delays.

According to an embodiment, the first lens array unit 300 includes two substrates 301 and 302 which face each other, and a light modulation layer 303 disposed therebetween. Electrodes capable of generating an electric field in the light modulation layer 303 are formed in at least one of the two substrates 301 and 302. The light modulation layer 303 may include, e.g., a liquid crystal layer. When the first lens array unit 300 is turned on, an electric field is generated inside the light modulation layer 303 such that liquid crystal molecules are rearranged to form a refractive index distribution that changes as a function of position. As a result, a lens can be formed for each unit region of the light modulation layer 303 by subjecting light incident to the light modulation layer 303 to a phase delay that changes as a function of position. As such, when turned on, the light modulation layer 303 forms a lens for each domain. When the light modulation layer 303 is turned off, the incident light propagates through the first lens array unit 300 without any phase delays.

According to an embodiment, a distance between the display unit 100 and the light modulation layer 203 of the second lens array unit 200 can be controlled by adjusting a thickness of at least one of the first interlayer 10 or the substrate 201, and a distance between the light modulation layer 203 of the second lens array unit 200 and the light modulation layer 303 of the first lens array unit 300 can be controlled by adjusting a thickness of at least one of the second interlayer 20 or the two substrates 202 and 301.

According to an embodiment, when the second lens array unit 200 is disposed on the display unit 100 using a same process as that used to manufacture the display unit 100, at least one of the first interlayer 10 and the substrate 201 may be omitted. Similarly, when the first lens array unit 300 is formed on the second lens array unit 200 using a same process as that used to manufacture the display unit 100, one or two of the second interlayer 20 or the two substrates 202 and 301 can be omitted.

Figure 24:
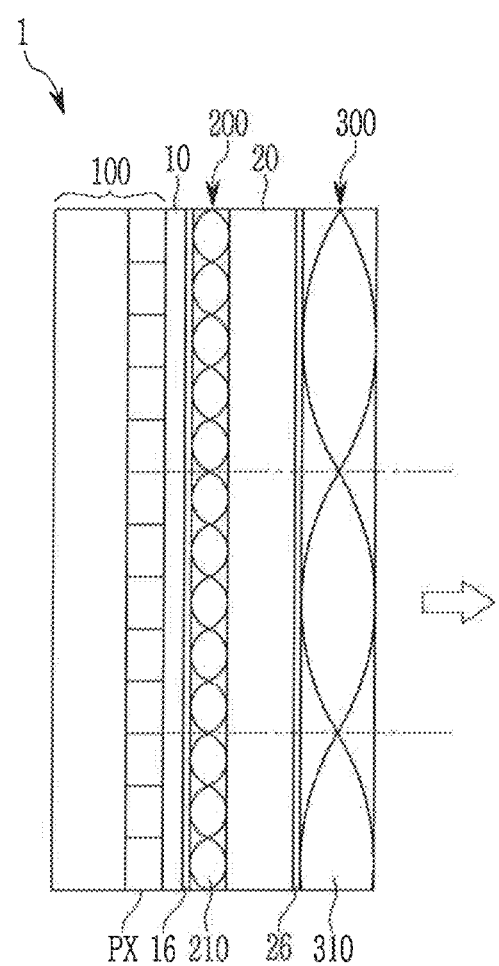

Next, referring to FIG. 24, a present exemplary embodiment is substantially the same as an aforementioned exemplary embodiment of FIG. 22. However, the display device 1 further includes an adhesive member 16 disposed between the first interlayer 10 and the second lens array unit 200, and an adhesive member 26 disposed between the second interlayer 20 and the first lens array unit 300. In this case, the second lens array unit 200 is manufactured as a separate panel and then attached to the display unit 100 by the adhesive member 16, and the first lens array unit 300 is manufactured as a separate panel and then attached to the second lens array unit 200 or the second interlayer 20 by the adhesive member 26. Each of the adhesive member 16 and the adhesive member 26 includes an optically clear resin (OCR) or an optically clear adhesive (OCA). Alternatively, the adhesive member 26 may be disposed between the second lens array unit 200 and the second interlayer 20.

According to an embodiment, the first interlayer 10 is used as an insulating layer for adjusting a distance between the display unit 100 and the second lens array unit 200, and is directly formed on the display unit 100 by, e.g., a deposition process. Similarly, the second interlayer 20 is used as an insulating layer for adjusting a distance between the second lens array unit 200 and the first lens array unit 300, and is directly formed on the second lens array unit 200 by, e.g., a deposition process. At least one of the first interlayer 10 and the second interlayer 20 may be omitted.

Next, referring to FIG. 25, a present exemplary embodiment is substantially the same as an aforementioned exemplary embodiment of FIG. 24. However, FIG. 25 illustrates an example in which the first lens array unit 300 and the second lens array unit 200 are switchable light modulation units which can be switched on or off, as in an exemplary embodiment of FIG. 23. Since the first lens array unit 300 and second lens array unit 200 have a structure that is substantially the same as that of the exemplary embodiment of FIG. 23, a detailed description thereof will be omitted.

In an exemplary embodiment of FIG. 25, and unlike in FIG. 24, the adhesive member 26 is disposed between the second lens array unit 200 and the second interlayer 20, but embodiments of the present disclosure are not limited thereto. For example, the adhesive member 26 may be disposed between the second interlayer 20 and the first lens array unit 300.

In addition, features of an exemplary embodiment of one or both of FIG. 23 and FIG. 24 may be similarly incorporated.

While embodiments of this disclosure has been described in connection with what is presently considered to be practical exemplary embodiments, it is to be understood that embodiments are not limited to the disclosed embodiments, but, on the contrary, are intended to cover various modifications and equivalent arrangements included within the spirit and scope of the appended claims.

What is claimed is:

1. A display device comprising:
   a display unit that includes a plurality of pixels;
   a first lens array unit that includes a plurality of first lenses, wherein each of the plurality of first lenses is a converging lens; and
   a second lens array unit disposed between the first lens array unit and the display unit and that includes a plurality of second lenses, wherein each of the plurality of second lenses is a converging lens,
   wherein each of the first lenses overlaps two or more of the pixels,
   a distance between two optical axes of adjacent two of the first lenses, both configured to pass light from the display unit, is equal to or greater than two times a pitch of the second lenses,
   such that light emitted from the plurality of pixels is refracted at the second lenses to generate enlarged pixel images which are then input to the first lens array unit, and
   wherein a number of the second lenses that face one first lens of the plurality of first lenses is equal to a number of pixels that face the one lens of the plurality of first lenses while the pitch of the second lenses is less than a pitch of the pixels,
   a straight line that connects a center of a pixel of the plurality pixels and a center of a second lens of the plurality of second lenses that corresponds to the pixel is not parallel with an optical axis of the second lens, and
   straight lines that connect centers of the pixels facing the one first lens and centers of the second lenses facing the one first lens converge on one point positioned in the one first lens.

2. The display device of claim 1, wherein, letting a shortest distance between the display unit and a center of a second lens of the plurality of second lenses by represented by D1, and a focal distance of the second lens be represented by f2, the following equation is satisfied:

$0.5 \times f2 \leq D1 \leq 1.5 \times f2$, and wherein, letting a shortest distance between a center of the second lens and a center of a first lens of the plurality of first lenses be represented by D2, and a focal distance of the first lens be represented by f1, the following equation is satisfied:

$0.5 \times f1 \leq D2 \leq 1.5 \times f1$.

3. The display device of claim 1, wherein each of the second lenses is a microlens, and each of the first lenses is a microlens or a lenticular lens.

4. The display device of claim 1, wherein each of the second lenses is a lenticular lens, and each of the first lenses is a microlens or a lenticular lens.

5. The display device of claim 1, further comprising:
   a transparent first interlayer insulating layer disposed between the display unit and the second lens array unit,
   wherein the second lens array unit is directly formed on the first interlayer insulating layer.

6. The display device of claim 1, further comprising:
   a transparent second interlayer insulating layer disposed between the second lens array unit and the first lens array unit,
   wherein the first lens array unit is directly formed on the second interlayer insulating layer.

7. The display device of claim 1, further comprising at least one of a first adhesive member disposed between the display unit and the second lens array unit, or a second adhesive member disposed between the second lens array unit and the first lens array unit.

8. The display device of claim 1, wherein at least one of the first lens array unit or the second lens array unit has a lens-sheet shape.

9. The display device of claim 1, wherein at least one of the first lens array unit or the second lens array unit is a switchable light modulation unit that includes a pair of substrates and a light modulation layer disposed between the pair of substrates.

10. A display device comprising:
    a display unit that includes a plurality of pixels;
    a first lens array unit that includes a plurality of first lenses, wherein each of the plurality of first lenses is a converging lens; and
    a second lens array unit disposed between the first lens array unit and the display unit and that includes a plurality of second lenses, wherein each of the plurality of second lenses is a converging lens,
    wherein a width of a second lens of the plurality of second lenses is equal to or less than a pitch of the pixels,
    a distance between two optical axes of adjacent two of the plurality of first lenses, both configured to pass light from the display unit, is equal to or greater than two times the width of the second lens such that light emitted from the plurality of pixels is refracted at the second lenses to generate enlarged pixel images which are then input to the first lens array unit,
    wherein letting a shortest distance between a center of the second lens and a center of a first lens of the plurality of first lenses be represented by D2 and a focal distance of the first lens be represented by f1, the following equation is satisfied:

$0.5 \times f1 \leq D2 \leq 1.5 \times f1$.

11. The display device of claim 10, wherein two or more of the pixels that correspond to one first lens correspond to different viewpoints.

12. The display device of claim 10, wherein, letting a shortest distance between the display unit and a center of a second lens of the plurality of second lenses be represented by D1, and a focal distance of the second lens be represented by f2, the following equation is satisfied:

$0.5 \times f2 \leq D1 \leq 1.5 \times f2$.

13. A display device comprising:
    a display unit that includes a plurality of pixels;

a first lens array unit that includes a plurality of first lenses, wherein each of the plurality of first lenses is a converging lens; and a second lens array unit disposed between the first lens array unit and the display unit and that includes a plurality of second lenses, wherein each of the plurality of second lenses is a converging lens, wherein a distance between two optical axes of adjacent two of the plurality of first lenses, both configured to pass light from the display unit, is equal to or greater than two times the width of the second lens, a number of the second lenses that face one first lens of the plurality of first lenses is equal to a number of pixels that face one lens of the plurality of first lenses such that light emitted from the plurality of pixels is refracted at the second lenses to generate enlarged pixel images which are then input to the first lens array unit, while the width of the second lens is less than a pitch of the pixels, a straight line that connects a center of a pixel of the plurality pixels and a center of a second lens of the plurality of second lenses that corresponds to the pixel is not parallel with an optical axis of the second lens, and straight lines that connect centers of the pixels facing the one first lens and centers of the second lenses facing the one first lens converge on one point positioned in the one first lens.

* * * * *